United States Patent
Perron (10) Patent No.: US 11,230,891 B2
(45) Date of Patent: Jan. 25, 2022

(54) THREADED JOINT

(71) Applicant: DIVERSITY TECHNOLOGIES CORPORATION, Edmonton (CA)

(72) Inventor: Stephane Perron, Edmonton (CA)

(73) Assignee: DIVERSITY TECHNOLOGIES CORPORATION, Edmonton (CA)

( * ) Notice: Subject to any disclaimer, the term of this patent is extended or adjusted under 35 U.S.C. 154(b) by 540 days.

(21) Appl. No.: 15/248,781

(22) Filed: Aug. 26, 2016

(65) Prior Publication Data

US 2017/0059063 A1    Mar. 2, 2017

Related U.S. Application Data

(60) Provisional application No. 62/210,768, filed on Aug. 27, 2015.

(51) Int. Cl.
*E21B 17/042* (2006.01)
*E21B 17/043* (2006.01)
*F16L 15/00* (2006.01)

(52) U.S. Cl.
CPC .......... *E21B 17/042* (2013.01); *E21B 17/043* (2013.01); *F16L 15/001* (2013.01); *F16L 15/006* (2013.01)

(58) Field of Classification Search
CPC ..... F16L 15/001; F16L 15/002; F16L 15/006; F16L 15/06; E21B 17/042; E21B 17/043
USPC .................................. 285/333, 334
See application file for complete search history.

(56) References Cited

U.S. PATENT DOCUMENTS

| | | | |
|---|---|---|---|
| 5,788,401 A † | 8/1998 | Drenth | |
| 6,047,997 A * | 4/2000 | Olivier | E21B 17/042 285/333 |
| 6,485,063 B1 † | 11/2002 | Olivier | |
| 2007/0228730 A1 † | 10/2007 | Sivley | |
| 2012/0013123 A1 † | 1/2012 | Bäck | |
| 2012/0025522 A1 * | 2/2012 | Granger | E21B 17/0423 285/333 |
| 2012/0068458 A1 * | 3/2012 | Granger | E21B 17/042 285/334 |

(Continued)

FOREIGN PATENT DOCUMENTS

EP    1 117 897 B1 †   5/2004

OTHER PUBLICATIONS

Boart Longyear, Global Product Catalogue, pp. 1-70, Oct. 31, 2008.†

(Continued)

*Primary Examiner* — Matthew Troutman
*Assistant Examiner* — William S. Choi
(74) *Attorney, Agent, or Firm* — Emerson Thomson Bennett; Daniel A. Thomson (57) ABSTRACT

There is disclosed a threaded joint for coupling together rods, tubes, pipes etc. The joint consists of helical box and pin thread segments each defined by a pressure flank and a clearance flank spaced apart from each other with alternating roots and crests. The pressure flank is defined by an S-curve extending between the root and the crest, which is defined by a first curvature c1 adjacent to the root and a second curvature c2 adjacent to the crest. c1 and c2 curve in opposing directions with an inflection point "i" between curvatures c1 and c2.

21 Claims, 11 Drawing Sheets

(56) References Cited

U.S. PATENT DOCUMENTS

2014/0102808 A1† 4/2014 Drenth

OTHER PUBLICATIONS

Vallourec, VAM® FJL, pp. 1-8, Mar. 2014, http://www.vallourec.com/OCTG/EN/E-Library/vamconnections/publication/VAM_FJL_4v_0514.pdf.†
Vallourec, VAM® Drilling, pp. 1-116, Dec. 31, 2011, http://blackstone.com.co/web/catalogos/vamdrilling/VAM%20DRILLING%20CATALOG.pdf.†

\* cited by examiner
† cited by third party

THREADED JOINT

FIELD

The invention relates to threaded joints for coupling together of rods, tubes, pipes and shafts, with particular application for subsurface drilling pipes and tubes.

BACKGROUND

Subsurface drilling, particularly for mineral exploration, involves the use of a rotating drill string assembled from multiple individual tubular rods that are coupled together as the drilling progresses. Typically, the rods are threaded together using threading that is provided at opposing ends of each rod. Significant axial and rotational stresses are placed on the threading during the drill rotation and drill string retraction. Furthermore, the rods should be coupled together and decoupled without the need to apply excessive torque or force to the drill rod segments.

Within the mining industry, there is an ongoing need to provide improved threaded joints that address some of the drawbacks that are present within prior art threaded joints.

SUMMARY

We describe a threaded joint for coupling together first and second members, in which each of said members comprises a central axis between respective ends thereof. The joint consists of threaded segments located on at least one end of the members, in which members may be coupled together by threading the respective segments together. In one aspect, the invention relates to a modified "buttress" thread that is self-locking.

In one aspect, the joint comprises a pin thread segment at one end of a first of said members and a tubular box thread segment at one end of a second of said members, in which the box thread segment and pin thread segment each comprise a helical thread defined by a pressure flank and a clearance flank. The box thread segment and pin thread segment each further comprises a root and a crest extending between said pressure flank and said clearance flank, wherein the pressure flank comprises an S-curve (when viewed in cross-section along an axial section) extending between the root and the crest. The S-curve is defined by a first curvature $c_1$ extending from the root and a second curvature $c_2$ extending from the crest with an inflection point "i" between curvatures $c_1$ and $c_2$. Curvatures $c_1$ and $c_2$ are opposed, whereby $c_1$ is concave and $c_2$ is convex. The S-shaped curvature of the pressure flank may extend from adjacent to the root to adjacent to the crest.

In one aspect, curvature $c_1$ equals $c_2$ in opposed directions. One or both $c_1$ or $c_2$ may comprise a segment of a circle having a radius R1.

Alternatively, one of both $c_1$ and $c_2$ may comprise a compound curvature comprising a segment of a first circle having a radius r1 R3 and a segment of a second circle having a radius R2 wherein R3 does not equal R2. In one aspect, R2 may be greater than R3.

In another aspect, the crest and root surfaces of said box and pin thread segments may each define a frustoconical surface, in which the angle of taper may be within the range of 0.75° and 1.63° relative to said central axis.

In a further aspect, the pin thread segment and box thread segment each comprises a first and second unthreaded segments at opposing ends of the helical thread, the first unthreaded segment is at a distal end of the member and having an end face defining the distal end surface of the first member. The second unthreaded segment has a radially inwardly stepped shoulder. The shoulders may each be angled relative to the perpendicular of the central axis within the range of 5 to 15 degrees. Alternatively, the shoulders may each comprise an inner region adjacent to the unthreaded segment comprising a negative slope of 12° to 15° relative to the perpendicular of the central axis and an outer region which is perpendicular to the central axis or has a negative slope of up to 4° relative to the perpendicular. The end face may comprise a mirror-image of the compound slope of the shoulder.

According to a further aspect, the clearance flanks may have a positive slope relative to the central axis by about 45°, about 60° or between 45° and 60°.

According to a further aspect, the inflection point i has a tangent with a slope relative to the central axis that is about 45°, about 60° or between 45° and 60°.

The helical thread may comprise either an unpaired helix comprising single-start thread or a paired helix comprising a double-start thread.

In a further aspect, the ratio of R2:R3 above is about 3:1 or greater.

In a further aspect, R3 is within the range of 0.007 inches to 0.015 inches.

In a further aspect, R3 is 0.005 inches to 0.012 inches and R2 is 0.024 inches to 0.060 inches.

Dimensions herein are normally provided in imperial measurements, unless otherwise specified. Directional references herein are normally with reference to the threaded tubular members being horizontal. The terms "inner", "inwardly" and similar terms refer to the direction that is radially inwardly towards the central axis of a given threaded member. The terms "outer", "outwardly" and the like refer to the opposed direction which is radially outwardly from the central axis.

References herein to angular deviations are generally expressed in terms of an angle from the central axis of the elongate member or, if specified, a plane which is perpendicular to the axis. The assumption is made herein that the central axis of the threaded coupling is linear. However, the present invention is equally applicable to curved members in which the central axis is non-linear. In such case, angular deviations may be considered to be based on a short segment of the central axis which closely approximates a straight line.

Definitions

For purposes of the present specification, the following definitions shall apply unless a different meaning is expressly stated or the context clearly requires a different definition.

"Rod": means an elongate member that is threaded at one or both ends for coupling with a similar rod. A rod may be cylindrical or tapered and may have a solid or hollow core. A rod may be fabricated from any suitable material. The term "rod" may in some cases be used interchangeably with one or more of the terms "shaft", "tube", or "casing".

"Thread" or "threading": means a projecting rib or recessed groove, usually helical in configuration, which may be coupled together by threading to a similar "mating" thread.

"Box thread": refers to the female threaded segment.

"Pin thread": refers to the male threaded segment.

"Pressure flank": refers to an essentially vertical or somewhat sloping surface on a thread forming between the root and crest surfaces. Normally, a pressure flank is brought into contact with a corresponding pressure flank when opposing threads are engaged with each other. The corresponding pressure flanks bear upon each other when axially load is induced on and the rod during makeup of a connection or a tensile load is applied during retraction of a drill string.

"Axial cross section": refers to a cross section on a plane that bisects a rod through a central axis that extends between opposed ends of the rod.

"Transverse cross section": refers to a cross section on a plane that is transverse to the central axis of the rod.

"Clearance flank": is the flank extending between the root and crest of the threading, opposed to the pressure flank. Normally, a given clearance flank of a threading will remain out of contact with an opposed clearance flank of the mating threading when threaded together.

"Root": refers to a cylindrical or frustoconical surface which extends between adjacent portions of a thread. The pin root is radially inward to the crest and the box root is radially outward to the crest and is normally parallel thereto. Normally, the root is co-axial with the central axis of the threading.

"Crest": is a frustoconical or cylindrical surface which is normally parallel to the root. A crest is the surface between the pressure flank and clearance flank of a thread. The axis of the crest is normally co-axial with the central axis of the threading.

"Negative slope": means a slope that provides an overhang between upper and lower portions of the negatively sloping surface whereby the uppermost portion of the sloping surface overhangs the lowermost portion. A negative slope normally defines a concave space beneath the overhang. For example, in FIG. 2 it will be seen that shoulder 30 defines a concave space when viewed in cross-section. In some cases, a surface may have multiple angles whereby a negative slope may have a positively sloping portion, even when the slope as a whole is negative.

"Interference fit": means a configuration whereby the pin thread has a slightly larger outside diameter than the inside diameter of the contact surfaces of the box thread. The portions of the pin thread that contact the box thread when fully tightened force a slight expansion of the box thread segment, to secure the respective threaded components together.

"Proximal": refers to a direction toward a point intermediate between opposing ends of the elongate tubular member 10 as described herein. "Distal" refers to an opposing direction towards one of the respective ends thereof.

"Buttress thread": refers to a thread having a trapezoid or saw-tooth profile which is designed to handle high axial force in one direction. A buttress thread has a load-bearing face which is perpendicular to the central axis or a slight slope, such as 7° or less. The opposing face has a relatively shallow slope such as about 45°.

BRIEF DESCRIPTION OF THE DRAWINGS

FIG. 19 is an enlarged axial cross section of a shoulder portion of a pin thread according to one aspect; the box thread shoulder is similar.

FIG. 20 is an enlarged cross section of an end portion of a pin thread according to one aspect; the end portion of the box thread is similar.

DETAILED DESCRIPTION

The following is a detailed description of certain embodiments of the invention. The present description is not intended to limit the scope of the invention in any respect, including limiting the scope thereof to any of the specific aspects, features, details, dimensions or configurations provided in this detailed description.

FIGS. 1-11 illustrate an embodiment of a modified buttress thread having a self-locking pressure flank. In this embodiment, the thread configuration relates to the threaded joint of a drill rod string. However, the present thread configuration has a range of applications, including use with a range of materials, fabrication methods and industrial applications. For example, without limitation, the thread configuration may be applicable for use with well casings, drilling tools and other components used for mineral and hydrocarbon exploration and environmental drilling.

Figure 1:
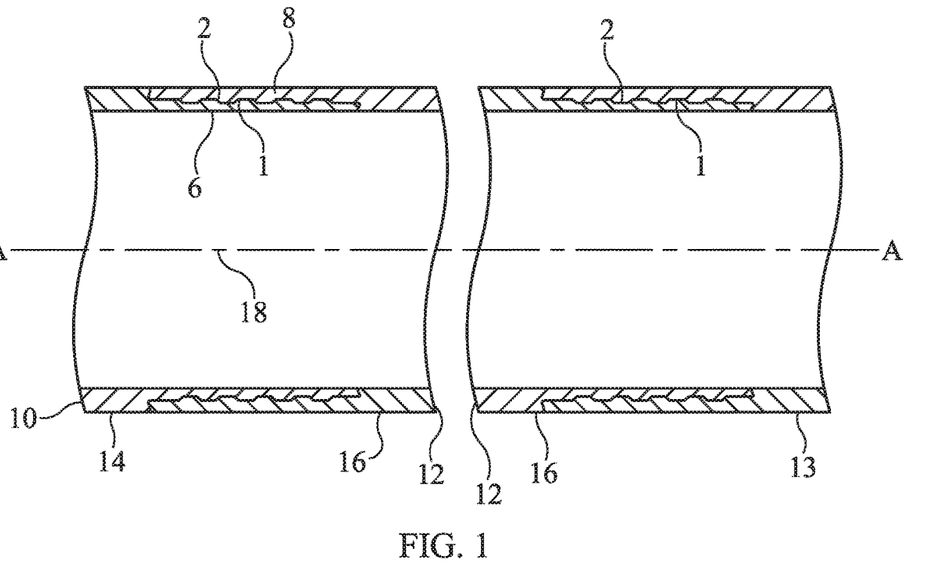
FIG. 1 is a cross-sectional view of threaded couplings disposed on the respective end segments of an elongate tubular member, according to one embodiment.

FIG. 1 depicts three tubular members 10, 12 and 13 which are essentially identical in structure and which may be coupled together in end to end fashion with threading provided at the respective ends thereof. The respective threading comprises a pin thread 1 (seen in more detail in FIG. 7) and a box thread 2 (seen in more detail in FIG. 6). An exemplary pin thread 1 is provided on a first end segment 6 of a first tubular member 10. A mating box thread 2 is provided on a second end segment 8, of a second tubular member 12. FIG. 1 also shows an opposing end of tubular member 12 comprising a pin thread 1. Thus, each tubular member 10 and 12 is provided with first and second threaded end segments 6 and 8 on opposing ends thereof. Tubular members 10 and 12 each further comprise a body 14 and 16 respectively, located between segments 6 and 8. A central longitudinal axis 18 extends axially between end segments 6 and 8 of each of members 10 and 12. When coupled together, the respective tubular members 10 and 12 are normally axially aligned, with a (normally) linear axis 18 extending between the opposing ends of the respective tubular members. It will be seen that a non-linear configuration may be provided, for example to accommodate a curved or arcuate drill string.

The outside diameter of tubular bodies 14 and 16 may be between 1.188" to 6.5" with a wall thickness of 0.188" to 0.25". The invention is not limited to these dimensions, nor to any particular dimensions identified in this specification.

Figure 2:
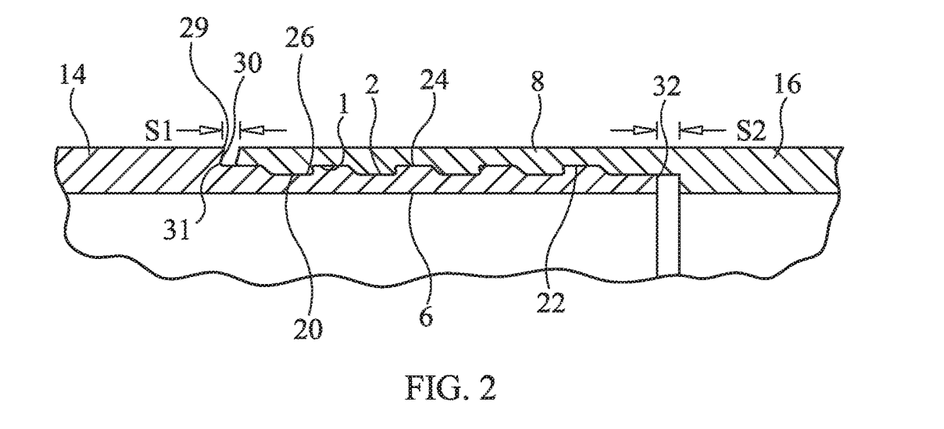
FIG. 2 is an axial cross-sectional view of portions of threaded members showing box and pin threads in expanded view.

As shown in FIG. 2, pin thread 1 is composed of a root surface 20 and a crest surface 22. Root and crest surfaces 20 and 22 lie on respective co-axial frustoconical (conical section) surfaces which are essentially planar when seen in cross section. The respective surfaces 20 and 22 are parallel to each other and taper inwardly by an angle of between 0.75 and 1.63 degrees relative to central axis 18 towards the distal end of threaded segment 6. Box thread 2 has a similar crest surface 26 and root surface 24 each being frustoconical and having a similar angle of taper of between 0.75 to 1.63 degrees inwardly towards the proximal end of segment 8. The respective threads 1 and 2 are configured to provide an interference fit between the pin crest and box root surfaces and a minimal clearance between the pin root and box crest when threaded together.

Figure 8:
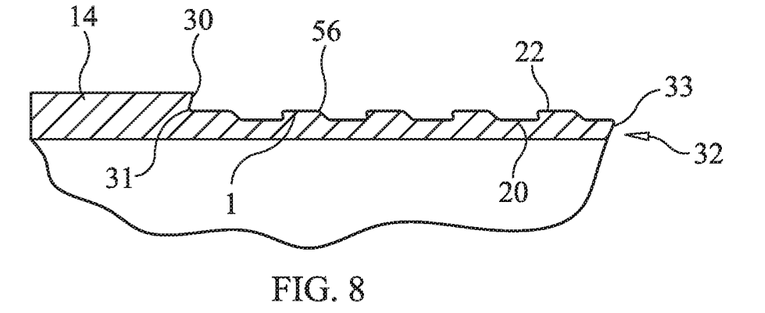
FIG. 8 is an axial cross-sectional view showing a pin threading in its entirety.
Figure 9:
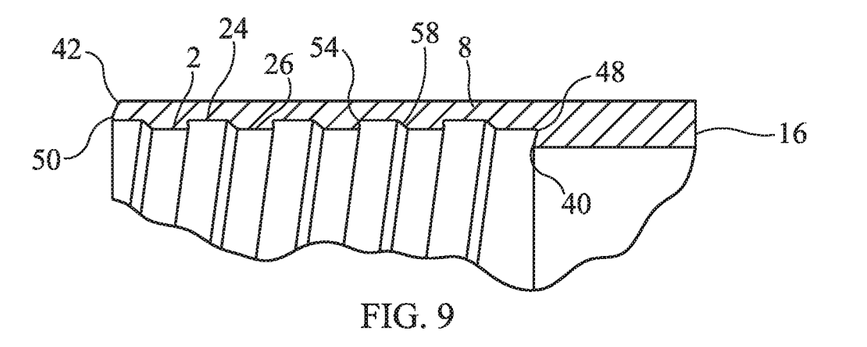
FIG. 9 is an axial cross-sectional view showing a box section in its entirety.
Figure 10:
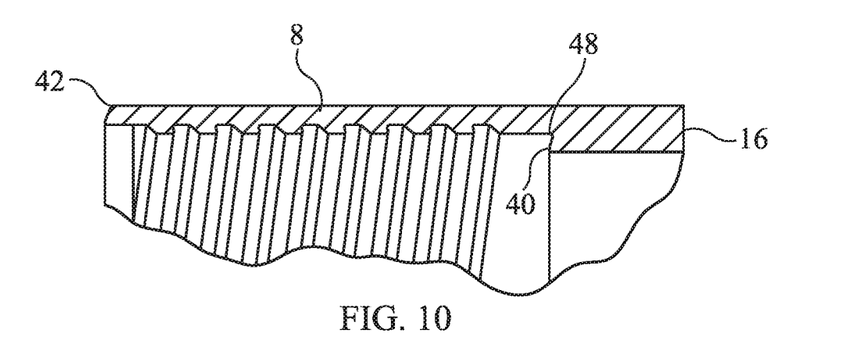
FIG. 10 is an axial partial-cross-sectional view showing a box section in its entirety.
Figure 11:
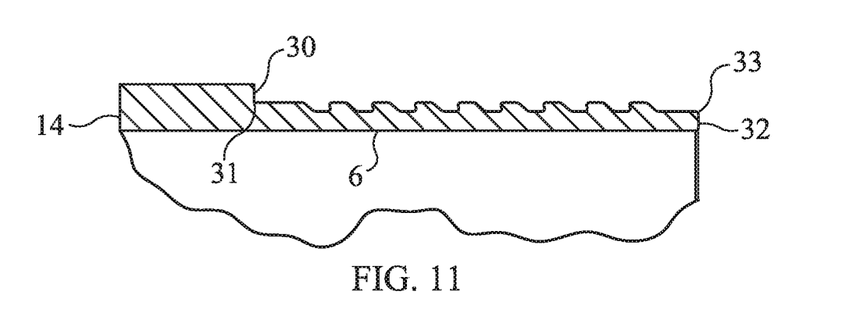
FIG. 11 is a further axial cross-sectional view showing a pin thread in its entirety.

As seen more clearly in FIG. 8, body 14 of tubular member 10 is stepped radially inwardly at a shoulder 30, which defines the proximal margin of pin thread segment 6. Shoulder 30 has a negative slope of about 5-15° relative to axis 18 whereby body 14 overhangs the proximal margin of segment 6. A fillet 31 defines the inner corner between shoulder 30 and segment 6. Fillet 31 merges the surface of segment 6 with shoulder 30. An outer corner 29 is opposed to fillet 31 and defines the border between shoulder 30 and the outer surface of body 14. Segment 6 is defined at its opposed, distal end by an end face 32. End surface 32 has a positive slope similar to shoulder 30 (5-15°) and an outer fillet 33 with a radius of curvature similar to fillet segment 31. Fillet 33 is located at the radially outer corner of end face 32

Fillet segments 33 and 50 may have a minimum radius of curvature of about 0.0156" and fillet segments 31 and 48 may have a maximum radius of curvature of about 0.0156". These respective dimensions provide minimal or no overlap in the respective radii of curvature so as to minimize or eliminate any interference between these segments when the members 10 and 12 are coupled together. Respective segments 33 and 50 are thus brought into abutting or adjoining relationship when the thread joint is fully made up without generating an interference fit between these respective regions. In more general terms, the radius of curvature of the concave shoulder fillet segments is greater than or equal to the radius of curvature of the corresponding abutting or adjoining convex end segment fillets.

Figure 3:
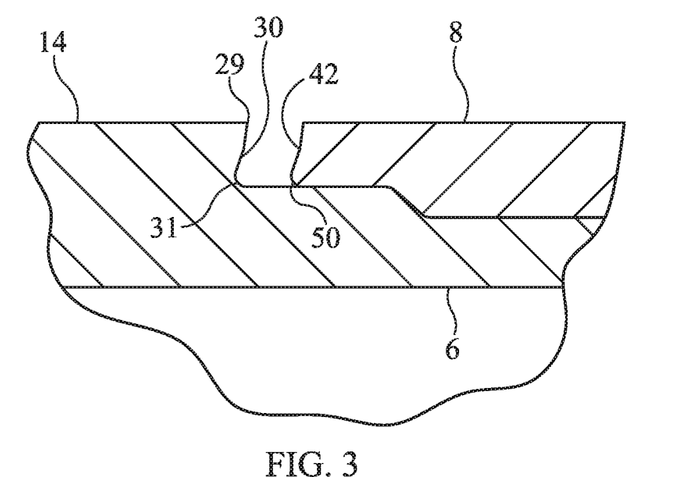
FIG. 3 is an expanded view of box and pin thread portions, showing end sections thereof.
Figure 4:
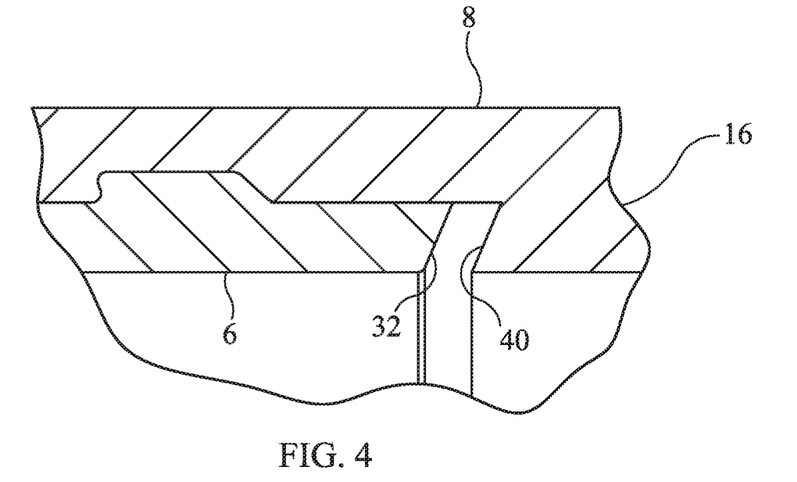
FIG. 4 is a view similar to FIG. 3 showing opposing end sections thereof.
Figure 5:
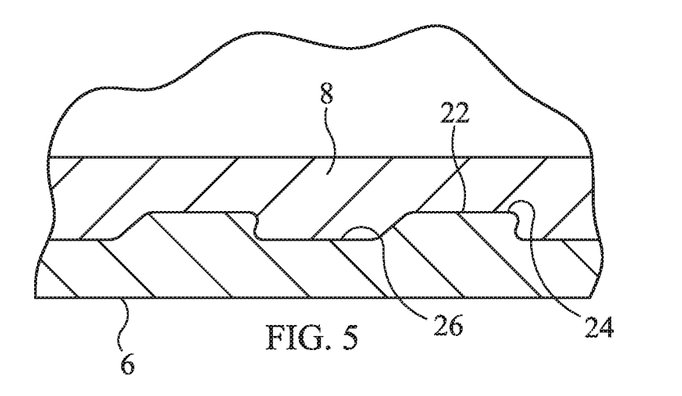
FIG. 5 is an enlarged axial cross-sectional view showing portions of the box and pin thread segment of the tubular member.

As seen in FIGS. 2, 3 and 4, when the respective box and pin threads are coupled and the tubular members 10 and 12 are initially threaded together to a non-fully tightened position, a stand-off or gap remains between the respective end surface 42 of the box thread and shoulder 30 of the pin thread, and likewise between end surface 32 and box thread shoulder 40. At this initial pre-torqued stage, this gap is approximately 0.04-0.09 inches (see S1 in FIG. 2). When torqued to proper requirements, the end surface 42 of the box thread contacts shoulder 30 of the pin thread, while a gap or stand off exists of 0.002 to 0.004 inches between end face 32 of the pin thread and shoulder 40 of the box thread.

The pin and box threads 1 and 2 are configured to provide an interference fit, whereby the pin crest 22 has an outside diameter of about 0.002 inches larger than the inside diameter of box thread root 24. When fully made up, the crest 22 of the pin and the root 24 of the box thread has an interference fit of approximately 0.002" on the diameter while the pin root 20 and the box crest 26 has minor clearance to allow room for thread compound and debris. By increasing the radius in the corner of the root 24 and pressure flank 54, it decreases the stress concentration of the part.

The rear flank of the pin and box has the same geometry but the box thread depth is shallower than the pin thread depth by 0.002 to 0.005" to provide interference between the pin crest and the box root and clearance between the pin root 20 and box crest 26. The box crest 26 extends off of a secant line and intersects to the rear flank radius.

As discussed above, the diameter of pin crest 22 is approximately 0.002" larger than the diameter of box root 24 so when the thread joint is made up "hand tight", the pin major diameter will contact the box major diameter and there will be approximately 0.04 to 0.09" standoff between the pin and box. When the joint is pre-torqued to the proper requirements, it will have an interference fit of approximately 0.002" on the diameter until the box face 42 and pin shoulder 30 fully contacts. At this point there will be a gap of 0.002 to 0.004" between the pin face 32 and box shoulder 40.

The pin and box segments 6 and 8 have a theoretical length relative to the central axis of 1.6 to 2.6" with the box segment 8 being longer than the pin segment 6 by up to 0.004" to ensure proper make up.

Figure 6:
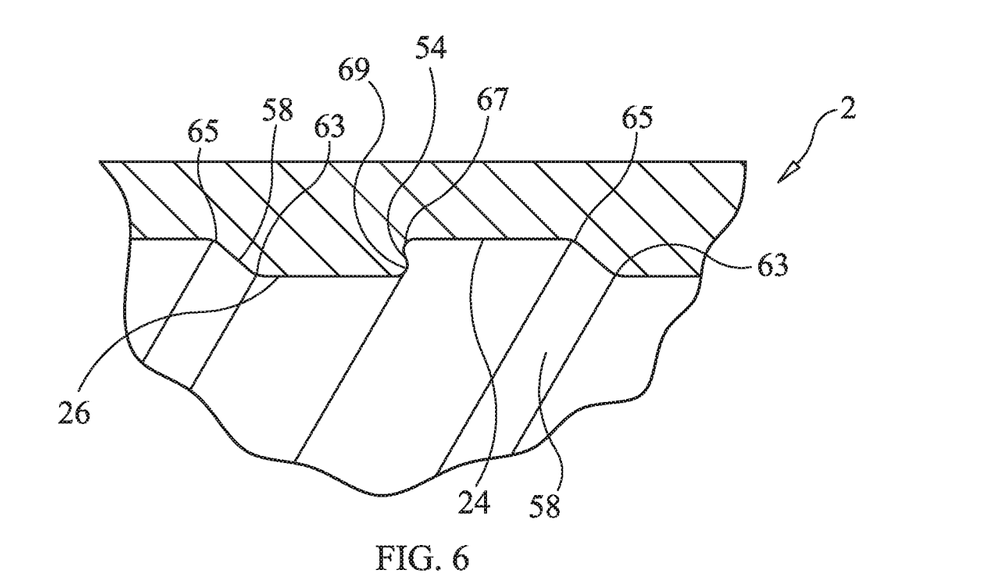
FIG. 6 is a further enlarged view showing a box threaded section.
Figure 7:
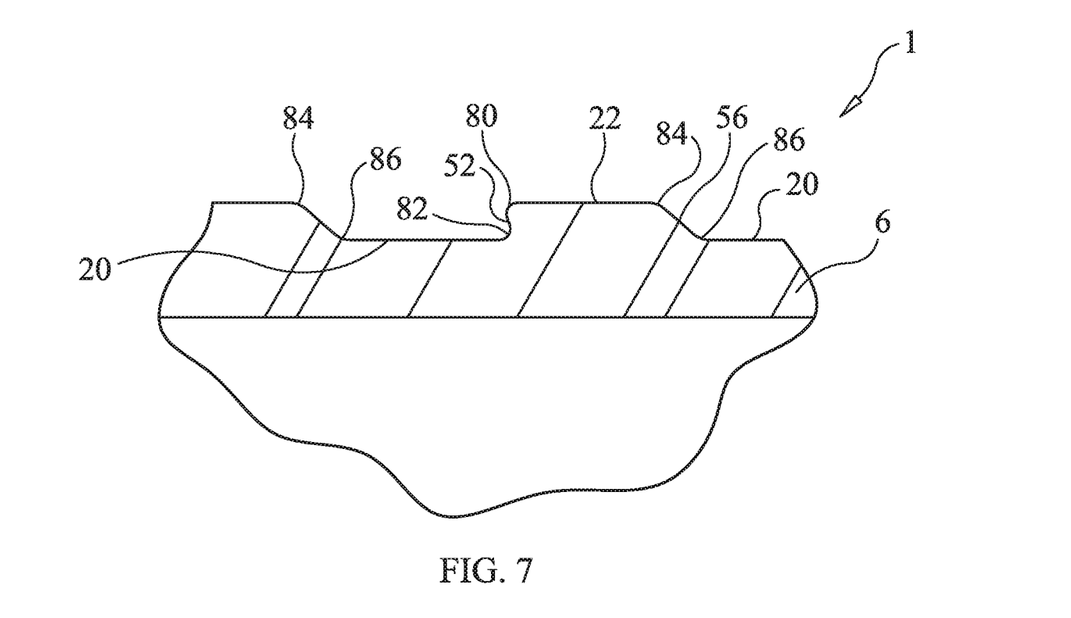
FIG. 7 is an enlarged view of a pin section.

As seen in FIGS. 6 and 7, pin and box threads have a pitch of 2 to 4 threads per inch, when provided on a single start thread. This value is doubled on an embodiment comprising a two-start thread, which comprises a paired helical threading and which is described below. The thread length relative to the central axis may be 1.6 to 2.6 inches, with the axial distance from the end face 42 to shoulder 40 of the box segment being longer than the corresponding distance of the pin segment by about 0.004 inches to ensure proper makeup. The pin crest diameter is approximately 0.002 greater than the box root diameter, to provide an interference fit.

Figure 14:
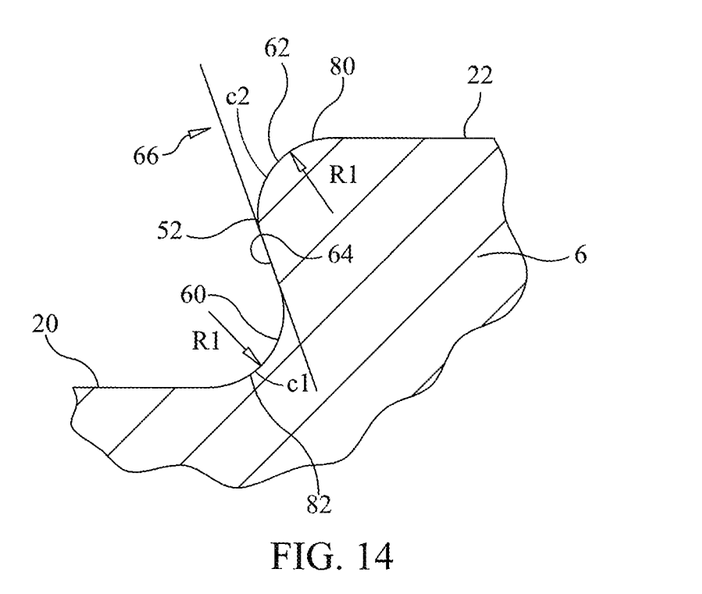
FIG. 14 is an enlarged view of a pressure flank of a pin or box thread showing a first embodiment thereof.

Referring to FIGS. 6 and 7, box thread pressure flank 54 and corresponding pin thread pressure flank 52 are shown, as well as pin thread clearance flank 56 and box thread clearance flank 58. Pin thread pressure flank 52 is shown in detail in FIGS. 14 through 16. Box thread pressure flanks 54 have identical mating configurations. FIG. 14 depicts a first embodiment of pressure flank 52 comprising an S-shaped cross-sectional configuration, composed of an inner concave section 60 and an outer convex section 62. Section 60 and 62 meet at inflection point 64. Surface 52 is thus continuously curved between root 20 and crest 22. Concave section 60 has a radius of curvature of R1, and convex segment 62 has an identical radius of curvature R1. At inflection point 64, surface 52 has a tangent angle 66. The slope of tangent angle 66 relative to axis 18, as well as the length of radius R1, determines the thread depth. Tangent 66 may comprise a negative angle of between 45 to 60 degrees relative to axis 18. The absence of flat surfaces on the respective pressure flanks allows the mating thread to lock while avoiding the compression characteristic of a conventional flat-surface reverse angle pressure flank.

The corresponding clearance flanks 56 and 58 are only in contact with each other until the pin shoulder 30 meets the box face 42. At this point, contact between the pin and box threads will shift to the respective rear pressure flanks 52 and 54. The threaded joint is then fully engaged. The initial relatively shallow attack angles of the clearance flanks 56 and 58 make it easier to start the thread by lining it up and reduce cross-threading.

The respective pressure and clearance flanks of the pin and box threads each meet the adjoining root and crest surfaces at a curved radius or fillet rather than a sharply-defined angle, as described herein. Turning first to the box thread 2 as seen in FIG. 6, a first convex radius or fillet 63 is provided at the intersection where clearance flank 58 meets box crest 26. A second concave fillet 65 is provided where box clearance flank 58 meets box root 24. A third convex fillet 69 is provided where box pressure flank 54 meets box crest 26 and a fourth concave fillet 67 is provide where box pressure flank 54 meets box root 24.

Turning next to pin thread 1 as seen in FIG. 7, pin thread 1 has a first convex fillet 80 where pin thread pressure flank 52 meets pin crest 22. A second concave fillet 82 defines the junction between pressure flank 52 and pin root 20. A third convex fillet 84 defines the junction between pin clearance flank 56 and pin crest 22 and a fourth concave fillet 86 defines the junction between pin clearance flank 56 and pin root 20.

It will be seen that when the pin and box threads are engaged, the respective convex fillets nest within the concave fillets. The radii of the respective convex fillets 63, and 84 are larger than the radii of the respective concave fillets 65, and 86 to ensure proper clearance during makeup of the joint.

Figure 24:
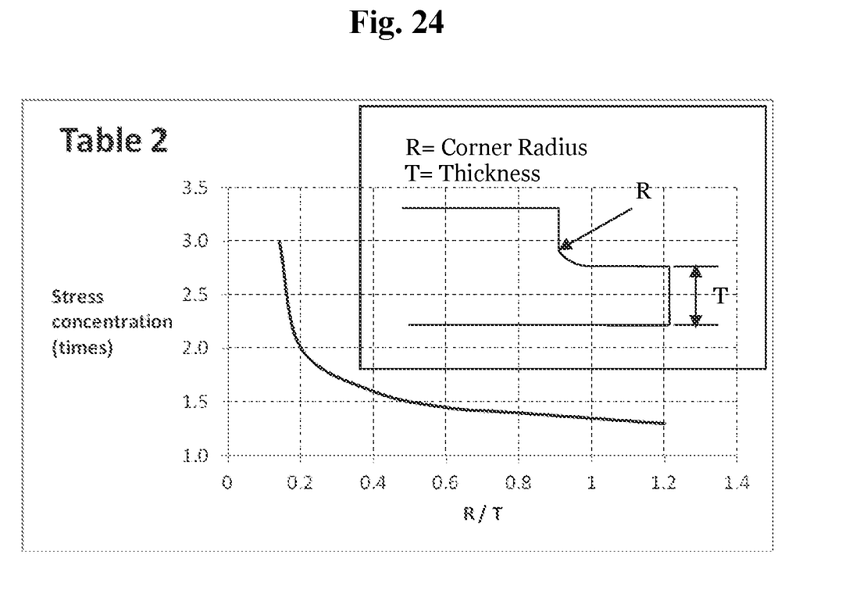
FIG. 24 is a graph showing stress concentrations.

The S-shaped curvature of pressure flank 52 provides a radius of curvature between pressure flank 52 and root 20. Increasing this radius causes a decrease of the stress concentration of the threading, as shown in FIG. 24.

In one embodiment, pin and box threads 1 and 2 form a single start thread comprising an unpaired helix. In this embodiment, seen in FIG. 12, the thread has a pitch of 2.0 to 4 threads per inch. In a second embodiment, shown in FIG. 13, the thread has a double-start configuration that consists of a paired helical threading. In this embodiment, the thread pitch may be doubled from the above. One advantage of a double start thread is to provide increased contact area on the pressure flank which also reduces the distance between the last active thread and the shoulder which makes for a stronger and stiffer thread lead-in without compromising the amount of turns required to fully make up the joint. This can also allow for a shorter thread lead-in adding additional strength to the joint.

Figure 12:
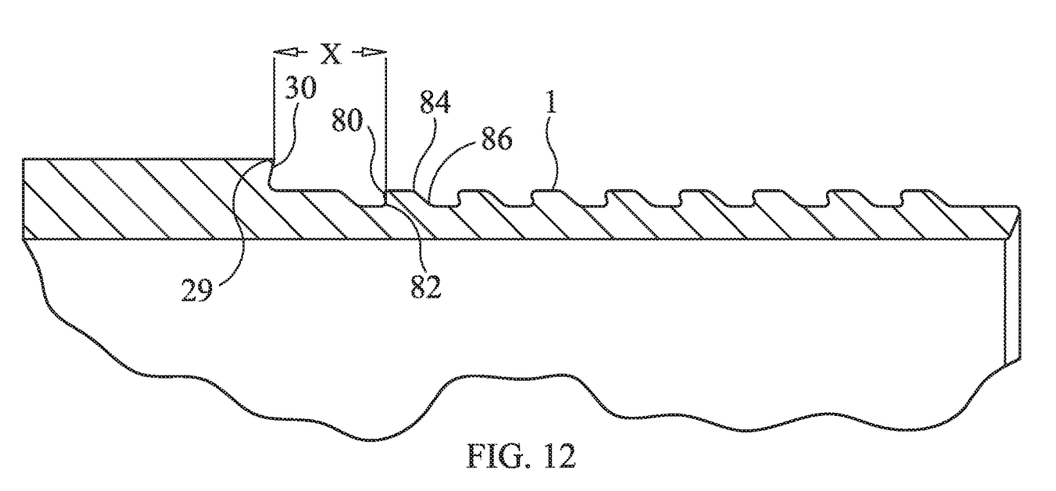
FIG. 12 is an axial cross-sectional view showing a pin section, of a double-start thread.
Figure 13:
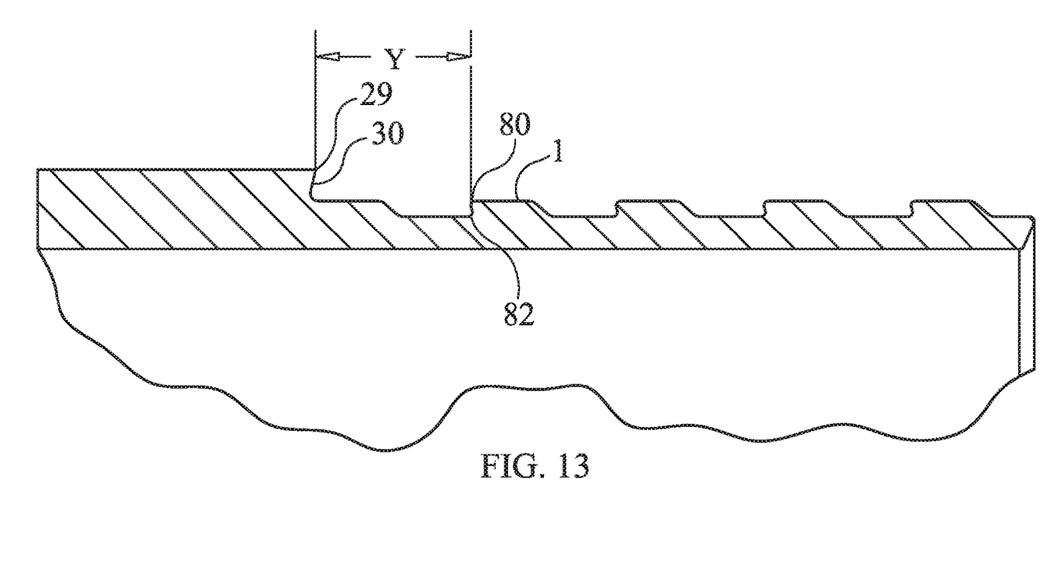
FIG. 13 is a view similar to FIG. 12 showing a single start thread.

The double start embodiment shown in FIG. 12 can have a "lead-in distance" x which is shorter than the corresponding "lead-in distance" y of the single start embodiment of FIG. 13. In the present embodiment, distance x is about 23% shorter than distance y. The "lead in distances" x and y comprise the axial spacing between the outer corner 29 that defines the edge of face 30 and fillet 52 that defines the margin between pressure flank 54 and crest 22 of pin thread 1. For purposes of measuring the lead-in distance, this measurement is derived from the proximal margin of pin thread 1, where pin thread 1 is closest to end face 30. The corresponding single start and double start embodiments of box threads 2 (not shown) have similar configurations to the pin threads of FIGS. 12 and 13.

Figure 15:
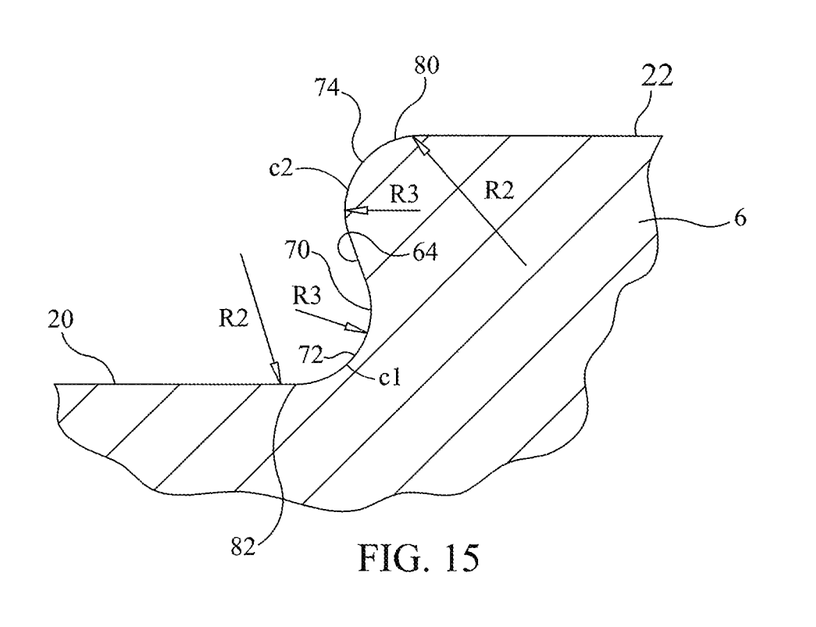
FIG. 15 is an enlarged view as in FIG. 14 showing a second embodiment thereof.

FIG. 15 shows a second embodiment wherein pressure flank 70 comprises a similar S-shaped curve extending between root 20 and crest 22. However, pressure flank 70 differs from pressure flank 52 in that concave segment 72 is composed of a dual radius curved surface. Surface 72 is a compound curvature, a portion of which is comprised of a primary (major) radius of curvature R3 and the remainder of which is comprises a secondary (partial) radius of curvature R2, wherein R2 is greater than R3. One segment of concave portion 72 thus has a radius of curvature of R2 and is adjacent to root 20, while a second portion of segment 72 which is adjacent to inflection point 64 has a radius of curvature of R3. In a similar fashion, convex segment 74 has a compound curvature, composed of a first segment of radius R3 and an adjoining second segment of radius R2. Convex and concave segment 72 and 74 meet at an inflection point 64, having a tangent 66.

Figure 16:
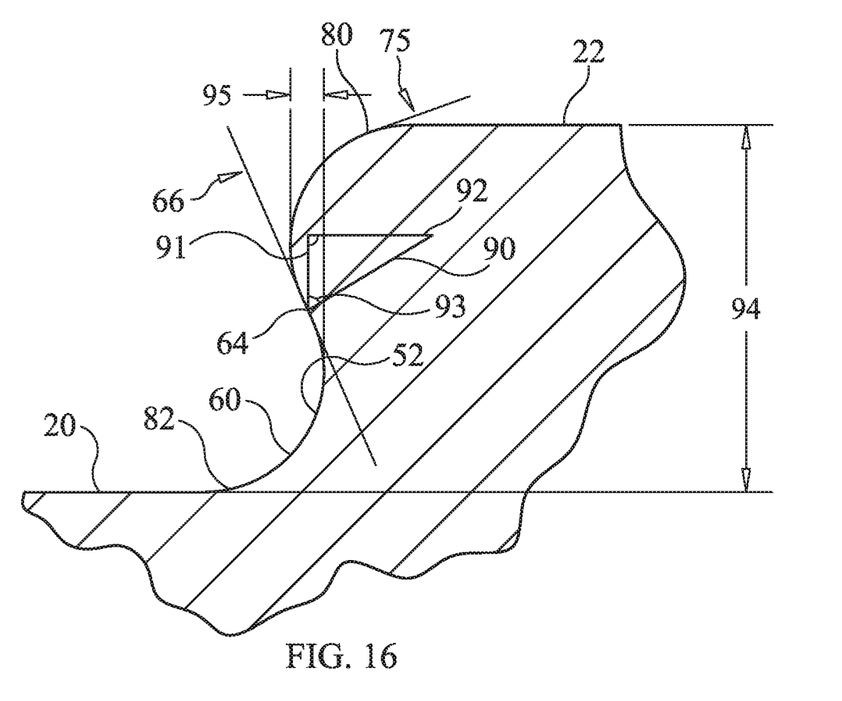
FIG. 16 is an enlarged view of an embodiment of FIG. 14, showing tangent lines and other aspects thereof.
Figure 17:
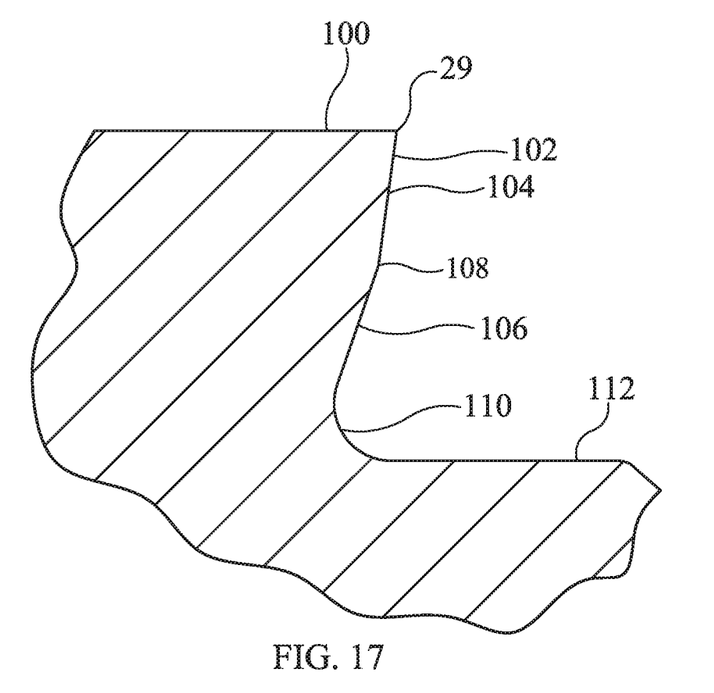
FIG. 17 is an axial sectional view showing a shoulder portion of a pin segment according to a further embodiment.
Figure 18:
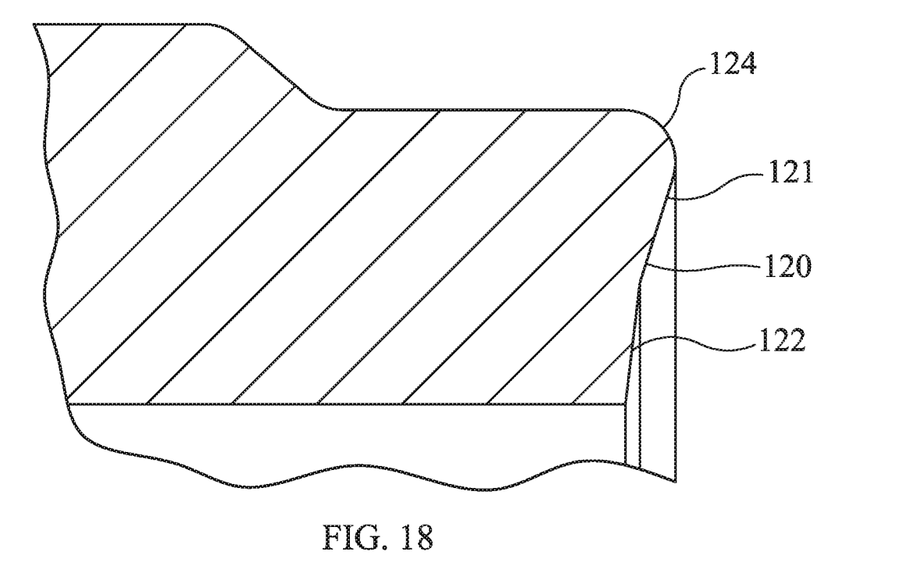
FIG. 18 is an axial sectional view showing an end face portion of a pin segment according to the embodiment of FIG. 17.
Figure 19:
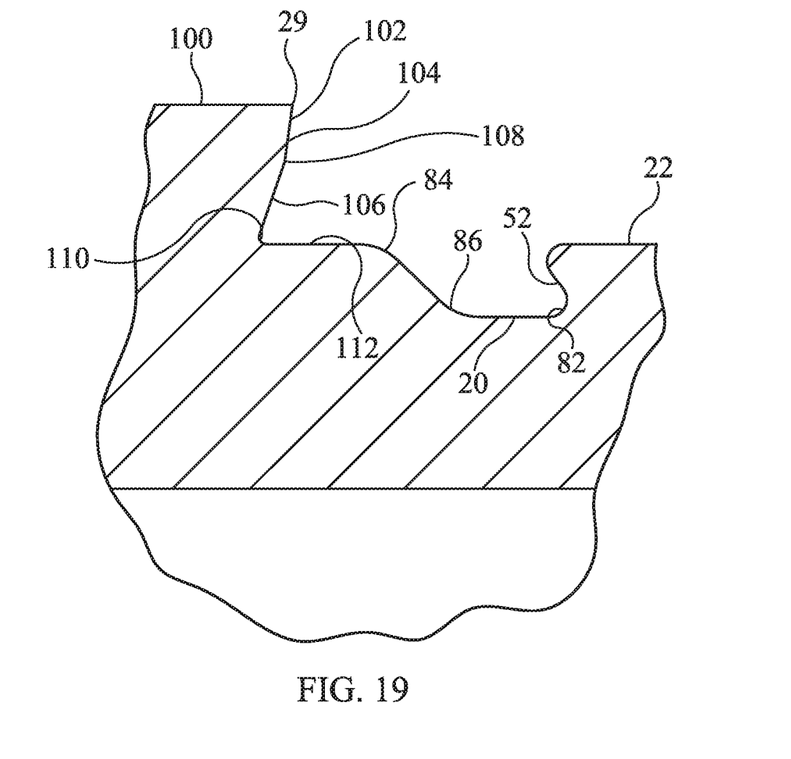
Figure 20:
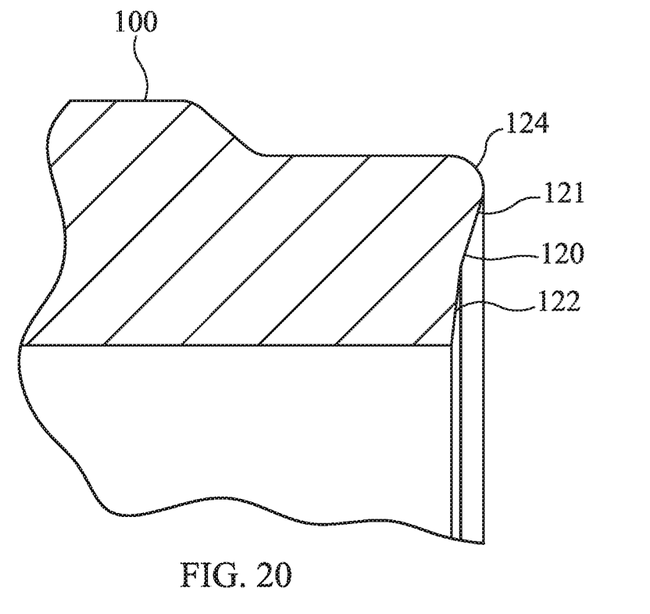

FIG. 16 provides additional details of the single radius curvature of the embodiment of FIG. 14. Pressure flank 52 can merge with crest 22 in a continuously curved arc. In one option, shown in a stippled 75 line in FIG. 16, pressure flank 52 can meet crest 22 at a flat surface 75 having a slope of 15° to 30° relative to crest 22. Flat surface 75 may be introduced in a machining process after the initial threading is cut. Flat surface 75 is provided to remove any irregularities that may have been introduced in the initial thread cutting step due to possible difficulties in cutting a smooth, continuously curved transition between flank 52 and crest 22. In this version, flat surface 75 has little or no significant effect on the performance of the thread.

Radius R1 combined with the tangent angle 66 effectively determines the thread depth between the respective root and crest surfaces and the quantum of interference 95 between respective pin and box pressure flanks (see Table 1).

FIGS. 17 to 20 show a further embodiment of pin thread 100. In this embodiment, shoulder 102 (FIG. 17) has a compound negatively sloped surface consisting of an outer portion 104 and an inner portion 106. Outer portion 104 is perpendicular to axis 18 or has a negative slope of up to 4° relative to a perpendicular to axis 18. Inner portion 106 has a negative slope of between 12-15°. Portions 104 and 106 meet at an inflexion region 108 which is approximately the mid-point of shoulder 102. In one aspect, inflection region 108 has a minimum radius of curvature of 0.156". Inner portion 106 meets segment 112 at a curved fillet 110. End surface 120, seen in FIG. 18 comprises a similar compound surface, consisting of an outer portion 121 with the same or similar taper as surface 106 and an inner surface 122 with the same or similar taper as surface 104. End surface 120 further comprises a rounded corner 124 having a similar radius as fillet 110. The pin shoulder 102 has a similar inflection region having a minimum radius of curvature of 0.156".

Figure 21:
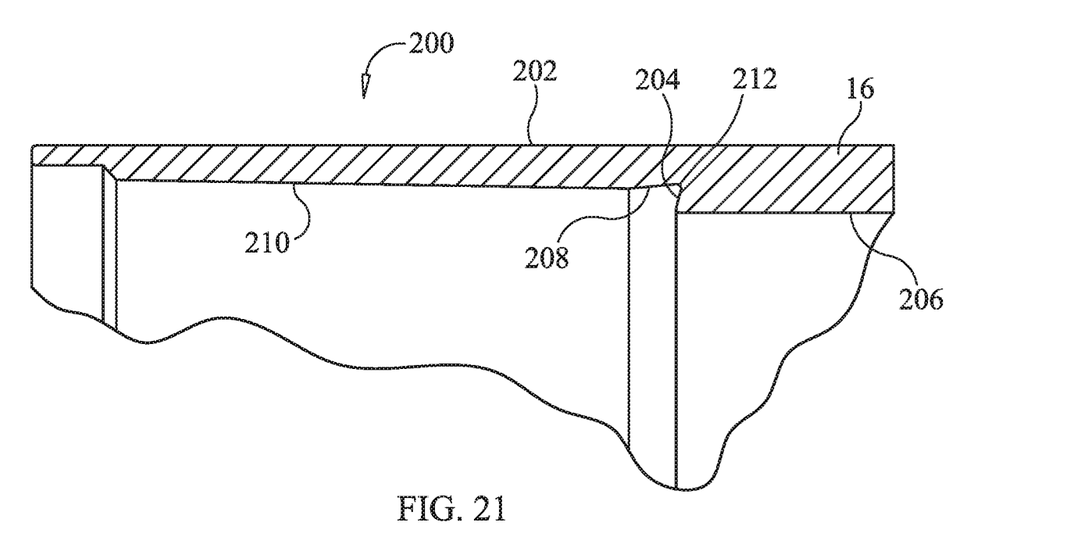
FIG. 21 is an enlarged axial cross-section view of a further embodiment, showing a portion of a box thread.
Figure 22:
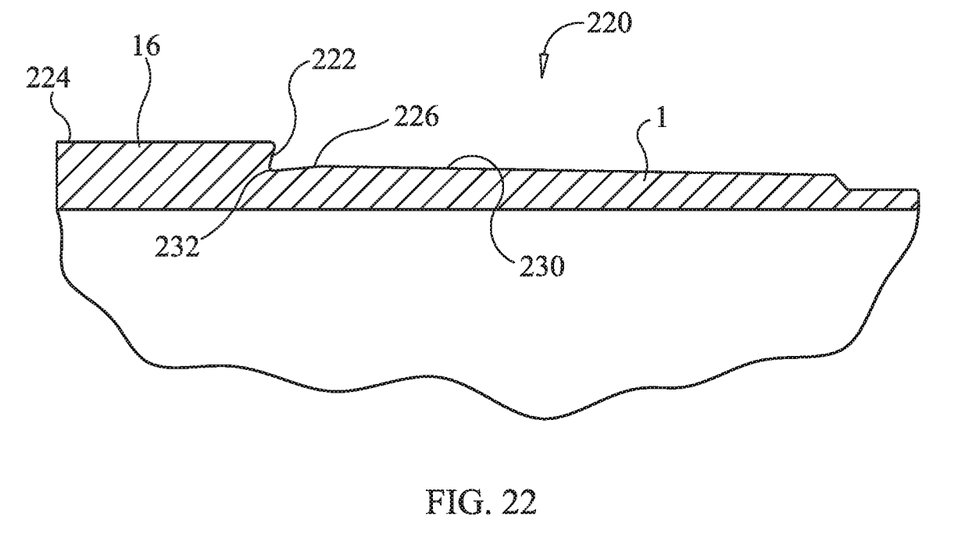
FIG. 22 is an enlarged axial cross-sectional view according to the embodiment of FIG. 21, showing a portion of a pin thread.

FIGS. 21 and 22 provide a further embodiment. FIG. 21 shows a proximal portion of a box thread 200 adjacent to body 16. Box thread 200 comprises an outer surface 202 which is continuous with the outer surface of body 16. Thread 200 comprises a shoulder 204, which comprises a tapered (frustoconical) annular surface that is undercut relative to the adjacent inner surface 206 of body 16. Shoulder 204 is perpendicular to the central thread axis or tapers outwardly (towards outer surface 202) and proximally and is within an angle of between 0° and 10°, preferably in the range of 5 to 10°, relative to a transverse (radial) plane of body 16.

Shoulder 204 merges with a tapered (frustoconical) ramp segment 208 which extends in a distal direction from shoulder 204. Ramp segment 208 slopes upwardly in a distal direction to merge with crest 210. As such, ramp segment 208 tapers outwardly in a proximal direction from crest 210 towards shoulder 204 to provide a radially enlarged segment of box thread 200. Ramp segment 208 is perpendicular to the central thread axis or has a slope of between 0° and 10°, preferably in the range of 5 to 10°, relative to the central elongate axis of body 16. The length of ramp segment 208 (proximal to distal ends thereof) is in the range of about 0.1500.200 inches. Ramp segment 208 merges with shoulder 204 at a curved radius 212.

FIG. 22 shows a distal segment of a pin thread 220 that provides a complementary profile to box thread 200. Pin thread 220 is provided with a sloping (frustoconical) proximal shoulder 222 adjacent to outer surface 224 of body 16. Shoulder 222 has configuration that matches shoulder 204 of box thread 200, whereby shoulder 222 undercuts outer surface 224 and is provided with a taper of about 0-10° relative to a plane that transversely bisects body 16. Shoulder 222 merges with a ramp segment 226 which comprises a frustoconical surface having a taper of about 0-10° relative to the central elongate axis of body 16. Segment 16 tapers radially inwardly from adjacent to the innermost (proximal) pin crest surface 230, to reach a maximum diameter adjacent to shoulder 222. When seen in axial cross section as in FIG. 22, ramp segment 226 slopes downwardly towards proximal shoulder 222.

The length of ramp segment 226 matches box ramp segment 208, namely in the range of about 0.150-0.200 inches from the proximal to distal ends thereof. Ramp segment 226 merges with shoulder 222 at a radius 232.

In operation, in the embodiment of FIGS. 21 and 22, threads 200 and 220 are threaded together thereby bringing the respective pin and box threads into engagement. The effect of the ramp segments leads to the respective pin and box lead-in being pulled into the ramp rather than pushed out when a high level of torque or torsion is applied to the respective threads.

Figure 23:
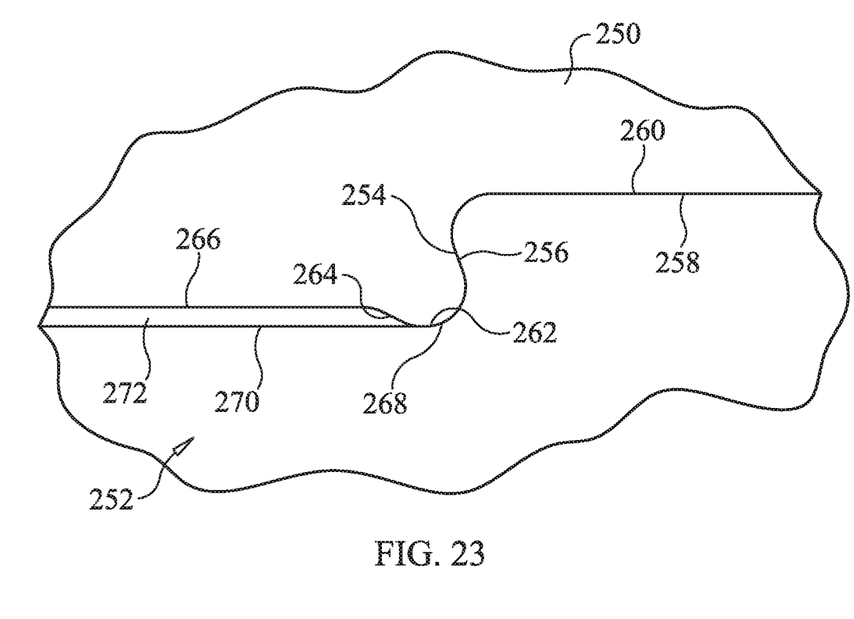
FIG. 23 is an axial cross sectional view showing pin and box threads according to a still further embodiment.

FIG. 23 shows box thread 250 and pin thread 252 according to a further embodiment. According to this embodiment, at least one of the pressure flanks of the pin and/or box threads comprises a projecting nose continuous with the pressure flank, such that the nose is adjacent to and merges with the corresponding crest. When the pin and box threads are engaged, the crest adjacent to the projecting nose crest becomes spaced apart from the root of the corresponding box or pin thread when threaded thereto.

According to this embodiment, the box and pin threads have S-curved pressure flanks 254 and 256 respectively. A flat crest 258 of pin thread 252 (at the major diameter of pin thread 252) is in contact with a flat root 260 of box thread 250 (at the major diameter of box thread 250) when threaded together. Box thread pressure flank 254 merges with an outer radius 262 at the minor diameter of box thread 250 (i.e. the innermost diameter). Outer radius 262 merges with a tapered segment 264 that angles outwardly towards the major diameter of box thread 250. As a result, radius 262 comprises a protruding nose when seen in an axial cross section (as in FIG. 23), which protrudes inwardly towards the central axis relative to the adjacent crest 266 of box thread 250. Crest 266 is thus recessed outwardly away from the central axis, when seen in axial section. In contrast, pressure flank 256 of pin thread 252 merges with a radius 268 which does not provide a similar nose-like projection.

It will be seen that nose 262 could alternatively or in addition be provided on the pin thread segment.

When box and pin threads 250 and 252 are threaded together, as seen in FIG. 23, crest 266 of box thread 250 is spaced apart from root 270 of pin thread 252, by a gap 272. It will be seen that gap 272 is formed and defined by the projecting portion of radius 262. Furthermore, this structure maximizes the thread flank contact between pressure flanks 254 and 256 without compromising the clearance between the adjacent crest and root segments 266 and 272 of box and pin threads 250 and 252.

Example 1

Table 1 is a chart that provides an example of thread configurations in which radius R1 ranges from 0.008 inches to 0.012 inches with tangent 66 comprising either 45 degrees or 60 degrees relative to axis 18.

TABLE 1

Rear Pressure Flank Chart (See FIG. 16):

Radius (90)
Adjacent (91)
Opposite (92)
Angle (93)
Depth of Thread (94)
Interference (95)
Adjacent = (Radius) × (Cosine of angle)
Opposite = (Radius) × (Sine of angle)
Depth of thread = 2(Radius + Adjacent)
Interference = 2(Radius − Opposite)

| 45 Degree Tangent | | | | |
|---|---|---|---|---|
| Radius | .008" | .009" | .010" | .011" |
| Thread Depth | .0274" | .0308" | .0342" | .0376" |
| Interference | .0046" | .0052" | .0058" | .0064" |
| 60 Degree Tangent | | | | |
| Radius | .009" | .010" | .011" | .012" |
| Thread Depth | .027" | .030" | .033" | .036" |
| Interference | .0024" | .0027" | .0029" | .0032" |

Example 2

FIG. 24 illustrates the reduction in internal stress concentration as the radius increases of the fillet between the root and the pressure flank of the box and pin threads according to one aspect of the invention.

By increasing the radius in the corner of the root and pressure flank, it decreases the stress concentration of the part Example 3: Measurement of Torsional Strength An embodiment was tested for torsional strength. According to this test, three threaded pipe assemblies were provided, each assembly consisting of a pair of pipes threaded together. Each pipe had a 1 inch diameter hole for receiving a torque transfer shaft. An end plate adapter interface was provided for fastening to the torque transfer shaft, consisting of a pair of flanges with pins and holes for connecting the torque transfer shaft to a torsion device. Each assembly was attached at one end, through the flange, to a bearing block shaft and a sprocket. The opposed end of the assembly was secured against rotation by attachment to a vertical post via a pin. Torque was applied to the pipe in a counter-clockwise direction using a servo-hydraulic actuator equipped with a calibrated load cell and displacement transducer, through a chain and a clevis.

Rotation of the threaded joint was measured using a second calibrated displacement transducer installed directly on the tube at approximately 1 inch from the joint. Torque was applied to the tube using angular displacement control at a constant rate of 10°/minute until failure occurred to the threaded joint. Load and angular displacement at the tube were recorded and used to plot the torque vs. angular displacement curves.

The scope of the present invention should not be limited by the preferred embodiments set forth in the examples but should be given the broadest interpretation consistent with the description as a whole. The claims are not to be limited to the preferred or exemplified embodiments of the invention.

The invention claimed is:

1. A threaded joint for coupling together first and second members, each of said members having a central axis between respective ends thereof, said joint comprising:
   a pin thread segment at one end of said first member; and
   a tubular box thread segment at one end of said second member, said box thread segment and said pin thread segment each comprising
   a helical thread defined by a pressure flank; and
   a clearance flank spaced apart from each other with alternating roots and crests extending between said pressure flanks and clearance flanks, wherein said pressure flank comprises:
      an S-curve extending between said root and said crest, wherein a surface of said S-curve is continuously curved between said root and said crest, said S-curve defined by
      a first curvature c1 adjacent to said root and
      a second curvature c2 adjacent to said crest, c1 and c2 curving in opposing directions with an inflection point "i" between said curvatures c1 and c2, wherein c1, or c2, or both c1 and c2 comprises
      a compound curvature comprising
      a segment of a first circle having a radius R3 and
      a segment of a second circle having a radius R2 wherein the ratio of R2:R3 is at least about 3:1.

2. The joint of claim 1 wherein R3 is within the range of 0.007 inches to 0.015 inches.

3. The joint of claim 1 wherein R3 is 0.005 inches to 0.012 inches and R2 is 0.024 inches to 0.060 inches.

4. The joint of claim 1 wherein said S curve extends from adjacent to the root to adjacent to the crest.

5. The joint of claim 1 wherein the crest and root surfaces of said box and pin thread segments each define a frustoconical surface.

6. The joint of claim 5 wherein the angle of taper of said frustoconical surface is within the range of 0.75 and 1.63 degrees relative to said central axis.

7. The joint of claim 1 wherein said pin thread segment and said box thread segment each comprise:
   a first and second unthreaded segment at opposing ends of said helical thread, each of said first unthreaded segments being at a distal end of said first and second members; and
   having an end face defining the distal end surface of said first and second members, each of said second unthreaded segments having a radially inwardly stepped shoulder.

8. The joint of claim 7 wherein said shoulder from each of said second unthreaded segments are each angled relative to the perpendicular of said central axis at 5 to 15 degrees.

9. The joint of claim 7 wherein said shoulder from each of said second unthreaded segments each comprise an inner portion adjacent to said unthreaded segment comprising a negative slope of 12° to 15° relative to the perpendicular of said central axis and an outer portion which is perpendicular to said central axis or has a negative slope of up to 4° relative to said perpendicular.

10. The joint of claim 9 wherein said end face from each of said first unthreaded segments each comprises a mirror-image configuration matching said shoulders from each of said second unthreaded segments.

11. The joint of claim 7 comprising a curved radius between said second unthreaded segment and an inner face.

12. The joint of claim 1 wherein said clearance flanks are sloped relative to the central axis by or between about 45° and about 60°.

13. The joint of claim 1 wherein said inflection point i has a tangent with a slope relative to said central axis that is between about 45° and about 60°.

14. The joint of claim 1 wherein said helical thread comprises an unpaired helix comprising single-start thread or a paired helix comprising a double-start thread or a triple-start thread.

15. The joint of claim 1 wherein said box thread segment and pin thread segment each comprise:
   a distal end adjacent to an exposed end thereof; and
   an opposed proximal end, said box thread segment comprising:
      a recessed shoulder at the proximal end thereof and
      an innermost crest surface adjacent to said shoulder wherein said innermost crest surface comprises a frustoconical surface tapering inwardly towards the distal end, and
   wherein said pin thread segment comprises:
      a recessed shoulder at the proximal end thereof and
      an innermost crest surface adjacent to said shoulder wherein said innermost crest surface comprises:
      a frustoconical surface tapering inwardly towards the proximal end.

16. The joint of claim 15 wherein the frustoconical surfaces of said pin and box thread segments have angles of taper that are substantially identical and which are in the range of about 0 to 10° relative to a central axis extending between opposing ends of said member.

17. The joint of claim 16 wherein said angle of taper is in the range of 5° to 10°.

18. The joint of claim 17 wherein said shoulders taper inwardly by substantially the same degree and are in the range of about 0 to 10° relative to a plane that transversely bisects said member.

19. The joint of claim 18 wherein said angle of taper is in the range of 5° to 10°.

20. The joint of claim 15 wherein the shoulders of said pin and box thread segments taper inwardly in a proximal direction.

21. The joint of claim 1 wherein at least one of said pressure flanks comprises a projecting nose continuous with said pressure flank, said nose being adjacent to and merging with the corresponding crest whereby said crest is spaced apart from the root of the corresponding box or pin thread when threaded thereto.

\* \* \* \* \*